United States Patent
Ignatius et al.

(10) Patent No.: US 6,637,757 B2
(45) Date of Patent: Oct. 28, 2003

(54) APPARATUS AND METHOD FOR COUPLING A DISCONNECTABLE STABILIZER BAR SYSTEM

(75) Inventors: Tom V. Ignatius, Waterford, MI (US); Jeffrey L. Kincaid, Clarkston, MI (US); William T. Reid, Jr., Holly, MI (US); Peter E. Asmaro, Troy, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 23 days.

(21) Appl. No.: 10/086,471

(22) Filed: Feb. 28, 2002

(65) Prior Publication Data

US 2002/0121748 A1 Sep. 5, 2002

Related U.S. Application Data

(60) Provisional application No. 60/273,779, filed on Mar. 3, 2001.

(51) Int. Cl.[7] .............................................. B60G 17/01
(52) U.S. Cl. ............................ 280/5.511; 280/124.106; 280/124.152
(58) Field of Search ........................ 280/5.511, 124.1, 280/124.106, 124.107, 124.149, 124.152, 5.506; 307/10.1, 44, 64, 65

(56) References Cited

U.S. PATENT DOCUMENTS

| 3,753,001 | A | | 8/1973 | Hiroshima et al. |
|---|---|---|---|---|
| 4,865,347 | A | | 9/1989 | Fukushima et al. |
| 5,045,835 | A | | 9/1991 | Masegi et al. |
| 5,597,180 | A | | 1/1997 | Ganzel |
| 5,744,876 | A | | 4/1998 | Fangio |
| 5,805,058 | A | | 9/1998 | Saito et al. |
| 5,859,583 | A | | 1/1999 | Mayumi et al. |
| 5,995,891 | A | | 11/1999 | Mayumi et al. |
| 6,149,166 | A | | 11/2000 | Struss et al. |
| 6,428,019 | B1 | * | 8/2002 | Kincad et al. ............ 280/5.511 |
| 6,498,403 | B1 | * | 12/2002 | Hagidaira et al. ............ 307/9.1 |
| 6,552,444 | B1 | * | 4/2003 | Manning .................. 307/10.8 |

* cited by examiner

Primary Examiner—Paul N. Dickson
Assistant Examiner—Faye M. Fleming
(74) Attorney, Agent, or Firm—Harness Dickey & Pierce, P.L.C.

(57) ABSTRACT

Improvements for a vehicle stabilizer bar assembly having a pair of stabilizer bar members that are selectively uncoupled via a clutch assembly to provide a vehicle with improved traction. A first improvement concerns a reserve powering apparatus for powering the clutch assembly in the event of an electrical failure that prevents the vehicle power source from transmitting electrical power to the clutch assembly. A second improvement concerns a speed sensing apparatus for inhibiting the operation of the stabilizer bar assembly in a disengaged condition if the speed of the vehicle is greater than or equal to a predetermined speed threshold. A third improvement concerns a logic for controlling the engagement and disengagement of a pair of stabilizer bar assemblies.

19 Claims, 6 Drawing Sheets

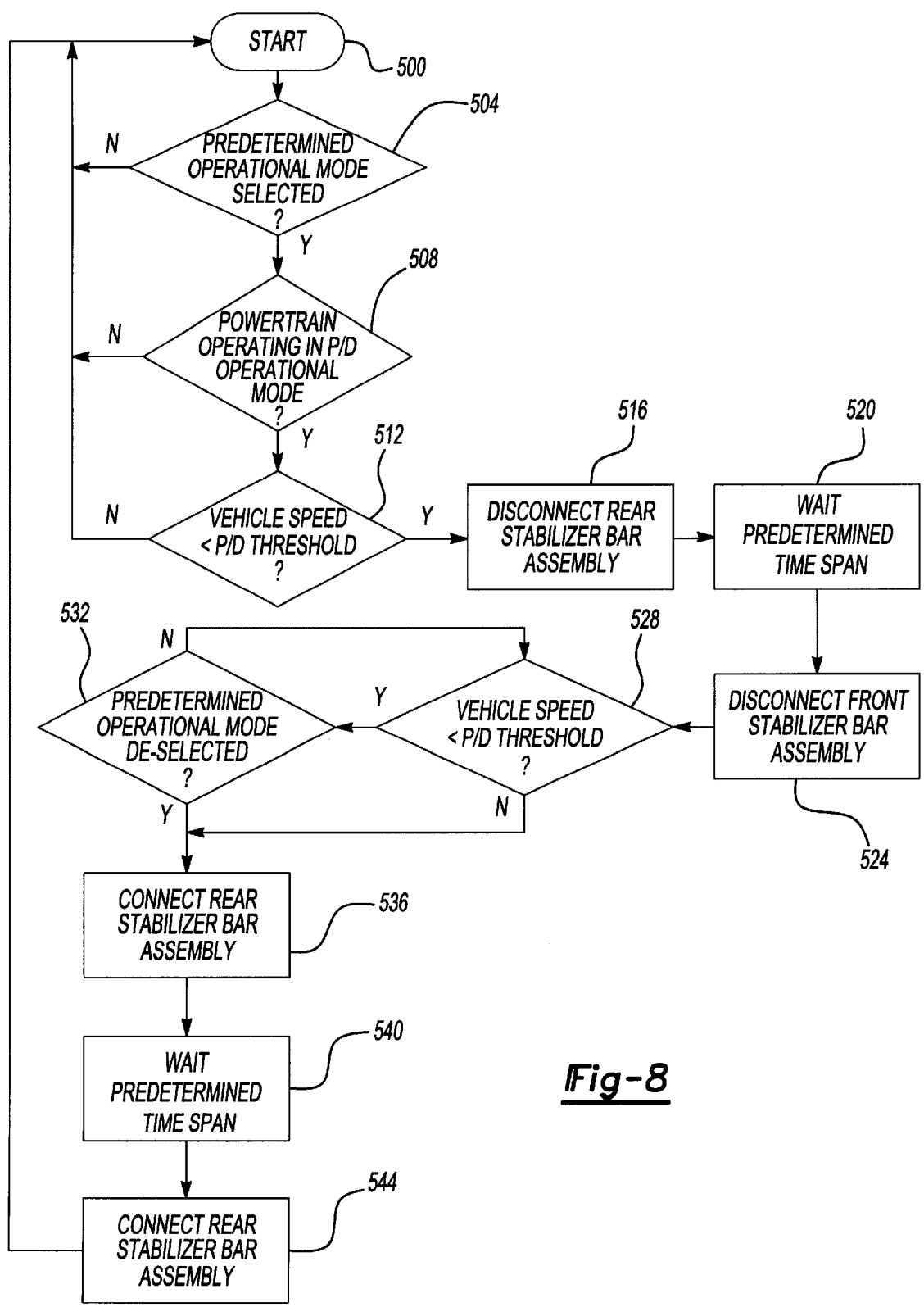

APPARATUS AND METHOD FOR COUPLING A DISCONNECTABLE STABILIZER BAR SYSTEM

CROSS-REFERENCE TO RELATED APPLICATIONS

This application claims the benefit of U.S. Provisional Application No. 60/273,779 filed Mar. 3, 2001 and of commonly assigned co-pending U.S. patent application Ser. No. 09/663,613 filed Sep. 18, 2000.

FIELD OF THE INVENTION

The present invention generally relates to a semi-active anti-roll suspension system having a pair of independently mounted stabilizer bar halves, which may be coupled to one another to control vehicle roll and more particularly to an apparatus and method for controlling the coupling of the stabilizer bar halves.

BACKGROUND OF THE INVENTION

Traditional vehicle suspension systems include resilient devices, such as coil springs and leaf springs, to flexibly support a portion of a vehicle and enable all of the wheels to maintain contract with the ground when traversing uneven terrain. Segregating the vehicle into unsprung and sprung portions in this manner is also useful for preventing severe impulsive forces from being transmitted to the vehicle occupants.

It is known that when vehicle travels around a corner, centrifugal forces acting on the vehicle tend to cause the sprung portion of the vehicle to roll. In severe instances, the effects of roll can cause instability and impede the ability of the driver to control the vehicle. Although the effects of roll are more pronounced with vehicles having a comparatively high center of gravity, such as vans or trucks, every vehicle is affected by roll.

In tuning the ride and handling of a vehicle, it is often desirable to soften or lower the spring rate of the suspension's springs to provide a softer, less harsh ride. One of the main drawbacks associated with this approach is that a suspension system having springs with a relatively low spring rate permits the vehicle body to roll at a relatively higher rate. Accordingly, it would seem that the combination of springs with a very low spring rate and a relatively stiff stabilizer bar would optimize both the ride and handling of the vehicle.

The relatively stiff stabilizer bar, however, tends to directly connect the vehicle wheels such that the motion of one wheel is copied to another wheel. If a vehicle so equipped was to strike a bump with one wheel, for example, the upward force (i.e., jounce) imparted to that wheel would be transmitted through the stabilizer bar to the opposite wheel, causing the opposite wheel to move in an upward direction. This "cross-talk" between the vehicle wheels is highly undesirable as it adversely affects vehicle ride.

Another drawback of stabilizer bars is that their torsional stiffness inhibits the free travel of the vehicle wheels. Modern materials and design techniques have substantially reduced the weight of the vehicle wheels and mounting structures to such an extent that the weight of a wheel and its mounting structure is typically insufficient to cause the stabilizer bar to rotate. While this problem is rarely, if ever, noticed on the relatively flat surfaces of modern roads, it can become apparent when the vehicle is operated over un-even terrain. In some situations, it is possible for one of the vehicle wheels to remain in an elevated position over a dip in the terrain due to the torsional resistance of the stabilizer bar. While situations of this severity are not routinely encountered, the fact remains that the stabilizer bar reduces vehicle traction in some situations.

One solution to the above-mentioned drawbacks is disclosed in copending and commonly assigned U.S. patent application Ser. No. 09/663,613 entitled "Semi-Active Anti-Roll System", the disclosure of which is hereby incorporated by reference as if fully set forth herein. This system employs a pair of stabilizer bar members, which are selectively uncoupled via a clutch assembly to improve vehicle traction in some situations. Despite the numerous advantages of this system, it is susceptible to improvement.

For example, it is highly desirable to provide a clutch controller for causing the stabilizer bar members to couple in response to a fault in the transmission of electrical power to the clutch assembly. Configuration in this manner may compromise vehicle traction in some situations, but effectively ensures that the vehicle will not be operated at high rates of speed with the stabilizer bar members disconnected.

In another example wherein a pair of these stabilizer bar systems are incorporated into a vehicle for the front and rear axles of the vehicle, it is highly desirable to control the coupling and disconnecting of the stabilizer bar members so as to improve vehicle stability and eliminate any roll-over steering effect that is generated as a result of the method by which the stabilizer members are connected and disconnected.

SUMMARY OF THE INVENTION

In one preferred form, the present invention provides a reserve powering apparatus for powering a clutch assembly in the event of an electrical failure, which prevents the vehicle power source from transmitting electrical power to the clutch assembly.

In another preferred form, the present invention provides a speed sensing apparatus for inhibiting the operation of the stabilizer bar assembly in a disengaged condition if the speed of the vehicle is greater than or equal to a predetermined speed threshold.

In yet another preferred form, the present invention provides a methodology for controlling the engagement and disengagement of a pair of stabilizer bar assemblies.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 8 is a schematic illustration in flowchart form of the methodology of the present invention for controlling the operation of the front and rear stabilizer bar assemblies.

DETAILED DESCRIPTION OF THE PREFERRED EMBODIMENTS

Figure 1:
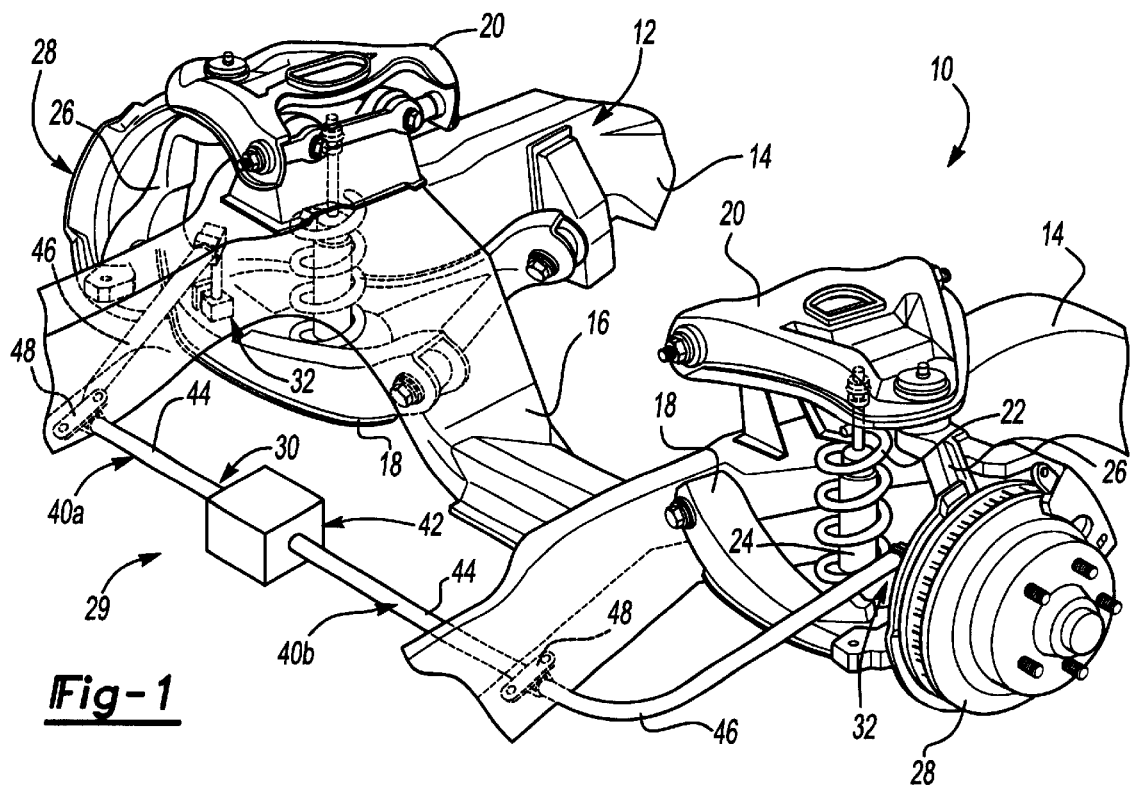
FIG. 1 is a perspective view of an exemplary independent front wheel suspension into which the stabilizer bar assembly of the present invention is incorporated.

With reference to FIG. 1 of the drawings, an exemplary independent front wheel suspension, generally indicated by reference numeral 10, of the type having suspension components at each wheel, which are suspended from the vehicle frame. Reference will be made to a vehicle frame in the present disclosure, yet those skilled in the art will recognize that many current vehicles do not have a frame as such, but instead have regions of the body, which act as an integrated frame structure. With this in mind, frame 12 is shown to partially include a pair of longitudinal side rails 14 and a crossbeam 16.

At each wheel, suspension 10 includes a lower control arm 18 and an upper control arm 20 which are both pivotally attached to frame 12. A strut assembly having a helical coil spring 22 and a strut damper 24 is retained between an intermediate portion of lower control arm 18 and frame 12 to support the weight of the vehicle body and any loads which are transmitted through lower control arm 18. Upper control arm 20 is connected to lower control arm 18 by a steering knuckle 26. A hub and rotor assembly 28 is rotatably attached to a spindle portion (not shown) of steering knuckle 26 such that a wheel and tire (also not shown) may be mounted thereon. Suspension system 10 further includes an anti-roll system 29 comprised of a stabilizer bar assembly 30 and a pair of end links 32 which connect the ends of stabilizer bar assembly 30 to lower control arms 18. Stabilizer bar assembly 30 is shown to include a pair of stabilizer bar members 40a, 40b and a clutch assembly 42. Each of the stabilizer bar members 40a, 40b is shown to be generally L-shaped having a central segment 44, which extends laterally across the vehicle and an arm segment 46, which extends longitudinally along the vehicle at the distal end of central segment 44. Each of the central segments 44 is rotatably attached to frame rails 14 by a mounting bracket 48. The opposite end of each arm segment 46 is connected to a corresponding one of the lower control arms 18 by one of the end links 32.

Figure 3:
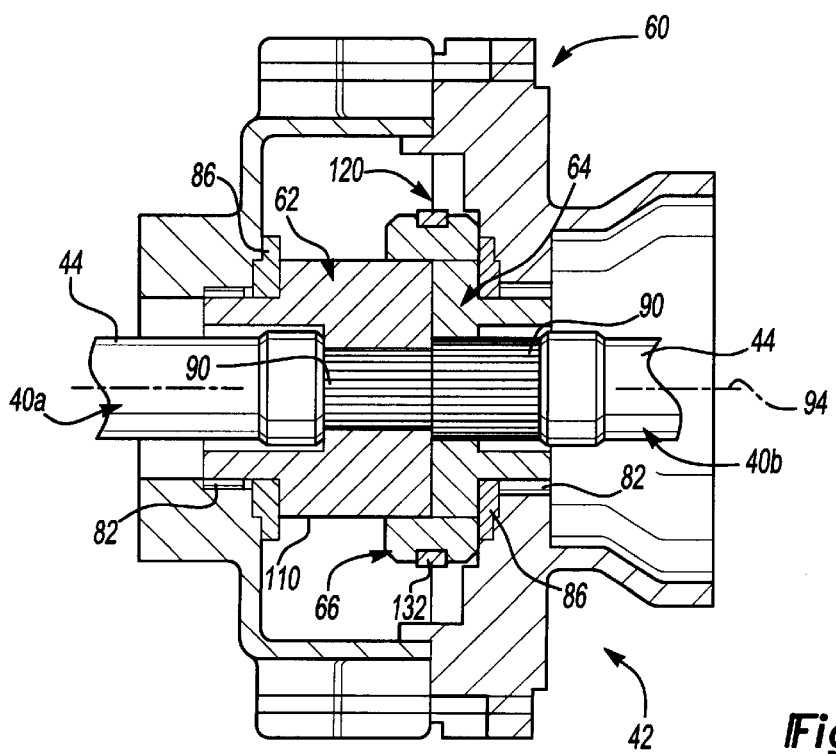
FIG. 3 is a longitudinal cross-section of a portion of the stabilizer bar assembly taken along the line 3—3.
Figure 2:
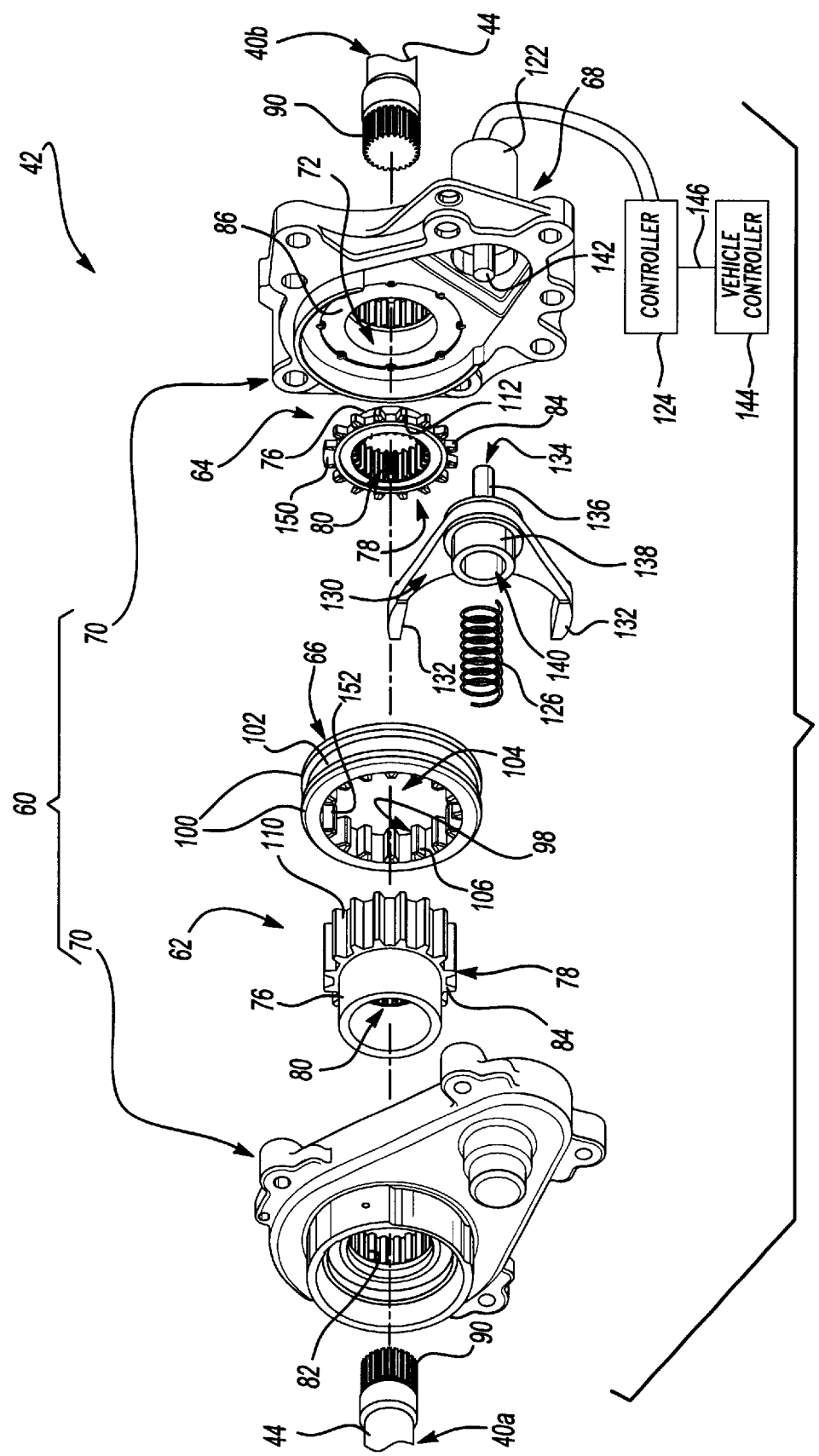
FIG. 2 is an exploded perspective view of the stabilizer bar assembly of FIG. 1.

In FIGS. 2 and 3, the exemplary clutch assembly 42 provided is illustrated to include a housing assembly 60, first and second gear members 62 and 64, respectively, a coupling member 66 and an actuator assembly 68. Housing assembly 60 includes a pair of housing members 70 which cooperate to define a central cavity 72 into which the central segments 44 of the stabilizer bar members 40a, 40b are received.

First and second gear members 62 and 64 are illustrated to include a journal portion 76, an external gear portion 78 and an internal spline portion 80. Journal portion 76 is supported for rotation by an associated bearing 82 in central cavity 72. The outer face 84 of each external gear portion 78 sized to engage an associated thrust washer 86 disposed between the housing member 70 and the external gear portion 78 to prevent contact therebetween. Internal spline portion 80 is sized to receive an external spline portion 90 formed into the proximal end of a corresponding one of the stabilizer bar members 40a, 40b. Meshing engagement of the external spline portion 90 of stabilizer bar member 40a and the internal spline portion 80 of first gear member 62 couples stabilizer bar member 40a and first gear member 62 for rotation about the of stabilizer bar members 40a, 40b. Likewise, meshing engagement of the external spline portion 90 of stabilizer bar member 40b and the internal spline portion 80 of second gear member 64 couples stabilizer bar member 40b and second gear member 64 for rotation about rotational axis 94.

Coupling member 66 is shown to include an internal gear portion 78 and a pair of annular flanges 100, which cooperate to define a clutch fork groove 102. Internal spline portion 80 includes an aperture 104 that defines a plurality of gear teeth 106. Aperture 104 is configured in a manner, which is complementary to first gear member 62 such that the gear teeth 106 of coupling member 66 meshingly engage the gear teeth 110 of first gear member 62. Configuration in this manner permits coupling member 66 to slide along rotational axis 94 while remaining in meshing engagement with first gear member 62. Coupling member 66 may be slid along first gear member 62 and into meshing engagement with second gear member 64. The teeth 106 and 112 of coupling member 66 and second gear member 64, respectively, are chamfered to improve the ability with which they meshingly engage.

The position of coupling member 66 along rotational axis 94 is controlled by actuator assembly 68. In the embodiment illustrated, actuator assembly 68 is shown to include a clutch fork 120, an actuator device 122, a controller 124 and a spring 126. Clutch fork 120 includes a generally U-shaped body portion 130 having a pair of arms 132, which are disposed within clutch fork groove 102. A pin member 134 intersects the body portion 130. A first portion 136 of the pin member 134 is disposed in cavity 72. A second portion 138 of pine member 134 includes a bore 140 that is sized to receive spring 126.

Actuator device 122 includes a positionable actuator member 142, which contacts the first portion 136 of pin member 134 and may be selectively positioned between a first actuator position and a second actuator position. Controller 124 is operable for generating an actuator signal, which is received by actuator device 122. In its most basic form, actuator signal is a discreet signal that toggles between two predetermined values (e.g., 0 and 1) which are indicative of the desired actuator position. Upon receipt of an actuator signal, actuator device 122 repositions actuator member 142 as necessary to affect the position of clutch fork 120. Placement of actuator member 142 in the first actuator position causes clutch fork 120 to slide coupling member 66 away from and out of meshing engagement with second gear member 64. Operation of stabilizer bar assembly 29 in this manner effectively de-couples stabilizer bar members 40a and 40b such that they are permitted to rotate independently of one another about rotational axis 94. Placement of actuator member 142 in the second actuator position causes clutch fork 120 to slide coupling member 66 toward and into meshing engagement with second gear member 64. Operation of stabilizer bar assembly 29 in this manner effectively couples stabilizer bar members 40a and 40b such that they are coupled for common rotation about rotational axis 94. Those skilled in the art will understand that coupling of stabilizer bar members 40a and 40b in this manner will permit the transmission of torque therebetween, which resists the roll of a vehicle body (not shown).

Preferably, controller 124 is coupled to a vehicle controller 144 via a data bus 146, thereby providing controller 124 with various vehicle data, such as the vehicle speed and an actively engaged transmission ratio. Configuration in this manner is advantageous in that controller 124 may then be employed to automatically position coupling member 66 in a desired position in response to a predetermined set of vehicle data. For example, upon the detection of a vehicle speed in excess of a predetermined amount, controller 124 may be programmed to generate the actuator signal to cause clutch fork 120 to slide coupling member 66 into meshing engagement with second gear member 64. Similarly, controller 124 may be programmed to cause clutch fork 120 so slide coupling member 66 out of engagement with second gear member 64 if a predetermined gear ratio has been engaged (e.g., four-wheel drive, low gear) and the vehicle speed is less than a predetermined amount.

Figure 6:
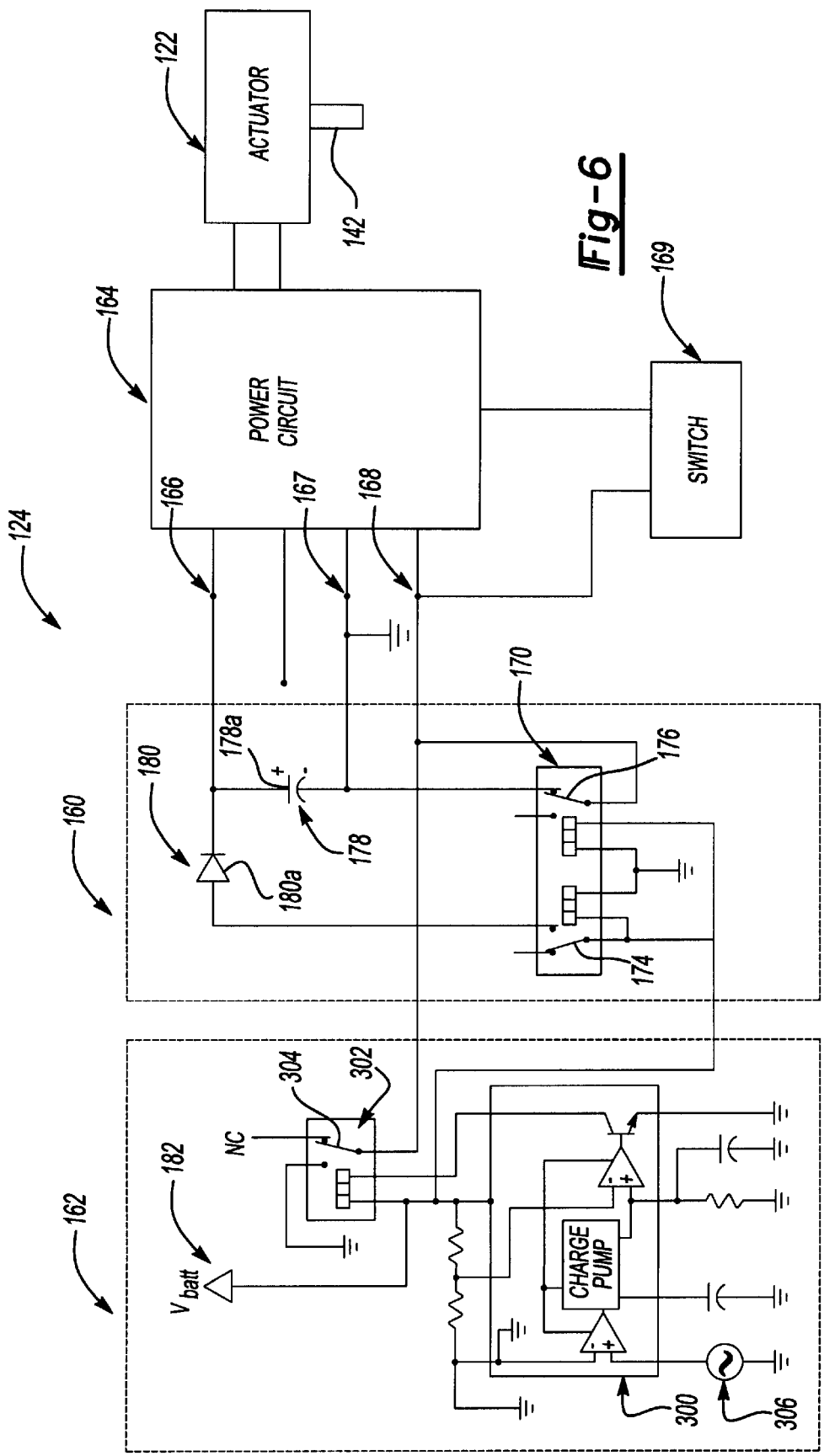
FIG. 6 is a schematic illustration of the clutch controller of the present invention.

With additional reference to FIG. 6, controller 124 is shown to include a reserve powering apparatus 160, a speed sensing apparatus 162 and a power circuit 164 for providing power to the actuator device 122. The power circuit 182 is shown to include a positive terminal 166, a ground terminal 167 that is coupled to an electrical ground, and a control signal terminal 168 that receives a control signal from a remotely mounted 2-position switch 169 that is employed by the vehicle operator to select the mode in which the anti-roll system 29 is operated.

In the particular embodiment illustrated, the reserve powering apparatus 160 includes a relay 170 with a normally open contact 174 and a normally closed contact 176, an electrical power storage device 178 and preferably, means 180 for preventing the electrical power storage device 178 from back-feeding to the contact 174. The contact 174 is coupled to a vehicle power supply 182 that provides electrical power only when the vehicle is operating and the contact 176 is coupled to the control signal terminal 168. When electrical power having a voltage in excess of a predetermined voltage is present at the relay 170, the contact 174 is closed so as to provide power to the positive terminal 166 and the contact 176 is opened so as to maintain the integrity of the electrical signal from the switch 169. When electrical power having a voltage in excess of a predetermined voltage is not present at the relay 170, the contact 174 is opened so as to interrupt the circuit between the vehicle poser source 182 and the positive terminal 166 and the contact 176 is closed so as to couple the control signal terminal 168 to the ground terminal 167.

In general, when the vehicle is operating and the switch 169 is placed in the first switch position, the switch 169 provides a first signal of a first predetermined voltage to the control signal terminal 168, causing the power control circuit 164 to apply power to the actuator device 122 to drive the actuator member 142 into the first actuator position to thereby decouple the stabilizer bar members 40a and 40b. Similarly, when the vehicle is operating and the switch 169 is placed in the second switch position, the switch 169 provides a second signal of a second predetermined voltage that is less than the first predetermined voltage to the control signal terminal 168 (e.g., couples control signal terminal 168 to the earth ground), causing the power control circuit 164 to apply power to the actuator device 122 to drive the actuator member 142 into the second actuator position to thereby couple the stabilizer bar members 40a and 40b. Regardless of the position of the switch 169, some of the electrical power that is fed toward the positive terminal 166 is employed to continuously charge the electrical power storage device 178.

In the event of an electrical fault wherein electrical power is no longer provided to the relay 170, contact 174 is switched to its open position and contact 176 is switched to its closed position as discussed above. Accordingly, the contact 174 is opened so as to interrupt the circuit between the vehicle power source 182 and the positive terminal 166 and the contact 176 is closed so as to couple the control signal terminal 168 to the ground terminal 167. In response to the coupling of the control signal terminal 168 to the ground terminal 167, the voltage at the control signal terminal 168 is less than the first predetermined voltage to the control signal terminal 168, causing the power control circuit 164 to apply power to the actuator device 122 to drive the actuator member 142 into the second actuator position to thereby couple the stabilizer bar members 40a and 40b. With the positive terminal 166 no longer receiving power from the vehicle power source 182, the electrical power storage device 178 is employed to provide power to the power circuit 164 to ensure that the actuator member 142 of the actuator device 122 is positioned in the second actuator position. In the particular example provided, the electrical power storage device 178 is illustrated to be a capacitor 178a, but may be any electric power storage device including a battery 178b.

The back-feed preventing means 180 is shown to be a diode 180a in the particular embodiment illustrated and is interposed between the contact 174 and the electrical power storage device 178 to ensure that power from the electrical power storage device 178 does not back-feed to the contact 174 rather than feed into the power circuit 164. Accordingly, those skilled in the art will understand that the back-feed preventing means 180 may also or alternatively include a switch, relay or other device that would open or otherwise prevent electrical power from back-feeding from the electrical power storage device 178 to the contact 174.

The speed sensor apparatus 162 includes a comparison circuit 300 and a relay 302 having a normally open contact 304 that is coupled to the control signal terminal 168. The comparison circuit 300 is shown to be coupled to a speed sensor 306 that monitors the speed of the vehicle and generates a speed signal in response thereto. In the example provided, the speed sensor 306 actually senses the rotational speed of the transmission output shaft, but as those skilled in the art will understand, the sensor may sense the velocity of any component whose speed is proportional to that of the vehicle. If while monitoring the speed signal the comparison circuit 300 determines that the speed of the vehicle is greater than or equal to a predetermined vehicle speed (e.g., 15 miles per hour), the relay 302 is actuated to cause the contact 304 to close, thereby coupling the control signal terminal 168 to the ground terminal 167. When this occurs, the voltage at the control signal terminal that is less than the first predetermined voltage and as such, this will cause the power control circuit 164 to apply power to the actuator device 122 to drive the actuator member 142 into the second actuator position to thereby couple the stabilizer bar members 40a and 40b. Configuration of the controller 124 in this manner is advantageous in that it prevents operation of the vehicle at high speed when the stabilizer bar members 40a and 40b are disconnected.

When the speed signal the comparison circuit 300 determines that the speed of the vehicle is less than the predetermined vehicle speed, the relay 302 is actuated to cause the contact 304 to open, thereby uncoupling the control signal terminal 168 from the ground terminal 167. Assuming that the vehicle power source 182 is providing the relay 170 with power, the voltage at the control signal terminal 168 is then responsive to the position in which the switch 169 has been placed (i.e., if the switch 169 has been positioned in the first switch position, the voltage at the control signal terminal 168 is greater than the first predetermined voltage and as such, this will cause the power control circuit 164 to apply power to the actuator device 122 to drive the actuator member 142 into the first actuator position to thereby uncouple the stabilizer bar members 40a and 40b).

Although various signals, such as the speed signal and the switch signal, have been illustrated and described herein as being discrete signals, those skilled in the art will understand that some or all of this data may also be transmitted over a conventional in-vehicle network. For example, commercially available vehicle and/or transmission controllers typically have the capability of determining the vehicle speed and providing this information over an in-vehicle network to other modules. Accordingly, the vehicle controller 144 may, in the alternative, calculate the speed of the vehicle, transmit this information over the vehicle network 146 where it is received by the controller 124. If the vehicle speed is greater than or equal to a predetermined speed, the controller 124 will output a digital signal to the relay 302 causing the contact 304 to open.

Spring 126 provides a degree of compliance in the positioning of clutch fork 120 to prevent damage to clutch assembly 42 in situations where coupling member 66 cannot be immediately engaged to or disengaged from second gear member 64. If, for example, coupling member 66 cannot engage second gear member 64 simultaneously with the movement of actuator member 142 into the second actuator position, spring 126 is compressed between housing 70 and body portion 130. The force generated by the compression of spring 126 is exerted onto clutch fork 120 and tends to push coupling member 66 into meshing engagement with second gear member 64 at an appropriate time (e.g., when the rotational speed and/or alignment of coupling member 66 and second gear member 64 are consistent).

Figure 4:
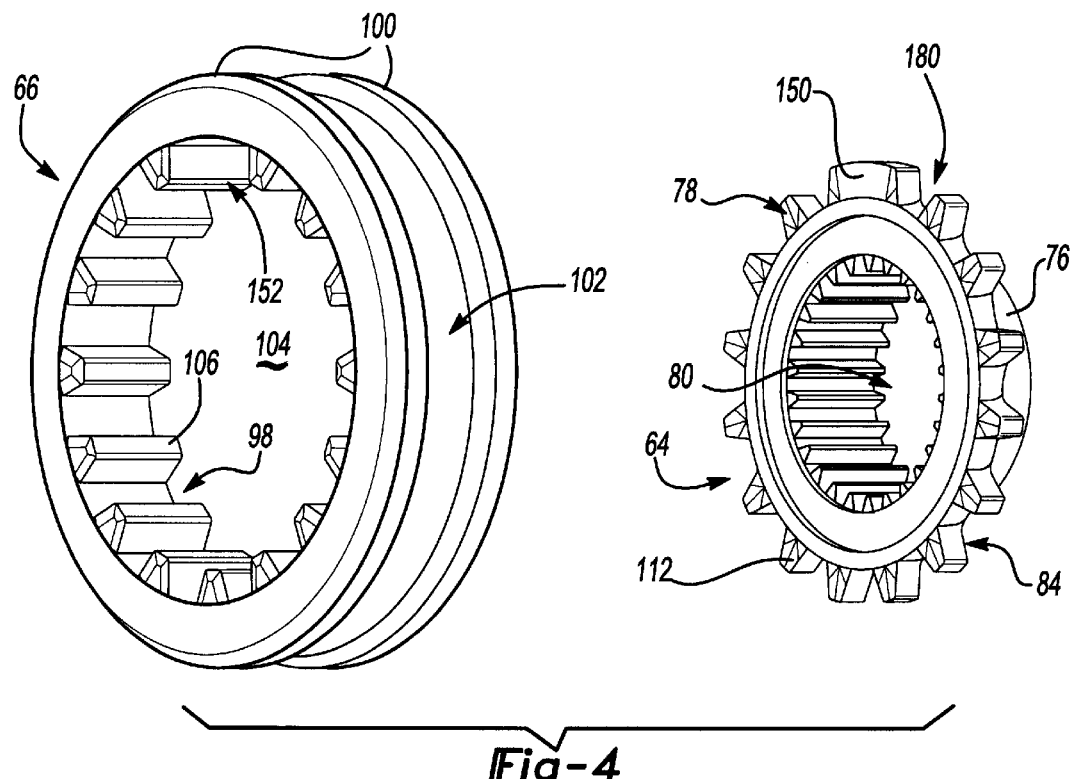
FIG. 4 is a front view of a portion of the clutch assembly illustrating the coupling member and the second gear member in greater detail.

Preferably, coupling member 66 and second gear member 64 are configured such that they can only be meshingly engaged when stabilizer bar members 40a and 40b are in a predetermined orientation. Methods for keying the orientation of one shaft to another are commonly known in the art and need not be discussed in detail herein. In the example provided, stabilizer bar members 40a and 40b are keyed to one another via a blocking tooth 150 and a blocking slot 152 which are shown in greater detail in FIG. 4. Blocking tooth 150 is formed, for example, in second gear member 64 and has a shape which is relatively wider than the other teeth 112 of second gear member 64. Blocking slot 152 is formed in coupling member 66 and configured to receive blocking tooth 150. Blocking tooth 150 and blocking slot 152 cooperate to prevent the engagement of coupling member 66 to second gear member 64 unless blocking tooth 150 and blocking slot 152 are aligned to one another. Those skilled in the art will understand that in the alternative, blocking tooth 150 may be formed into coupling member 66 and blocking tooth 150 may be formed into second gear member 64.

Also preferably, clutch assembly 42 also includes a de-lashing mechanism 180 (FIG. 4) for removing the gear lash between the first and second gear members 62 and 64 and the coupling member 66. Such de-lashing mechanisms are well known in the art and need not be discussed in detail. In the particular embodiment illustrated, a portion of the teeth 112 of the second gear member 64 are formed on a helix so that the second gear member 64 will rotate about the rotational axis 94 in response to meshing engagement with coupling member 66 to cause the teeth 106 of the coupling member 66 to contact the teeth 112 of the second gear member 64. Those skilled in the art will understand that the rotational motion of the second gear member 64 will also cause coupling member 66 to rotate relative to the first gear member 62 to cause their teeth 106 and 110, respectively, to contact one another.

Figure 5:
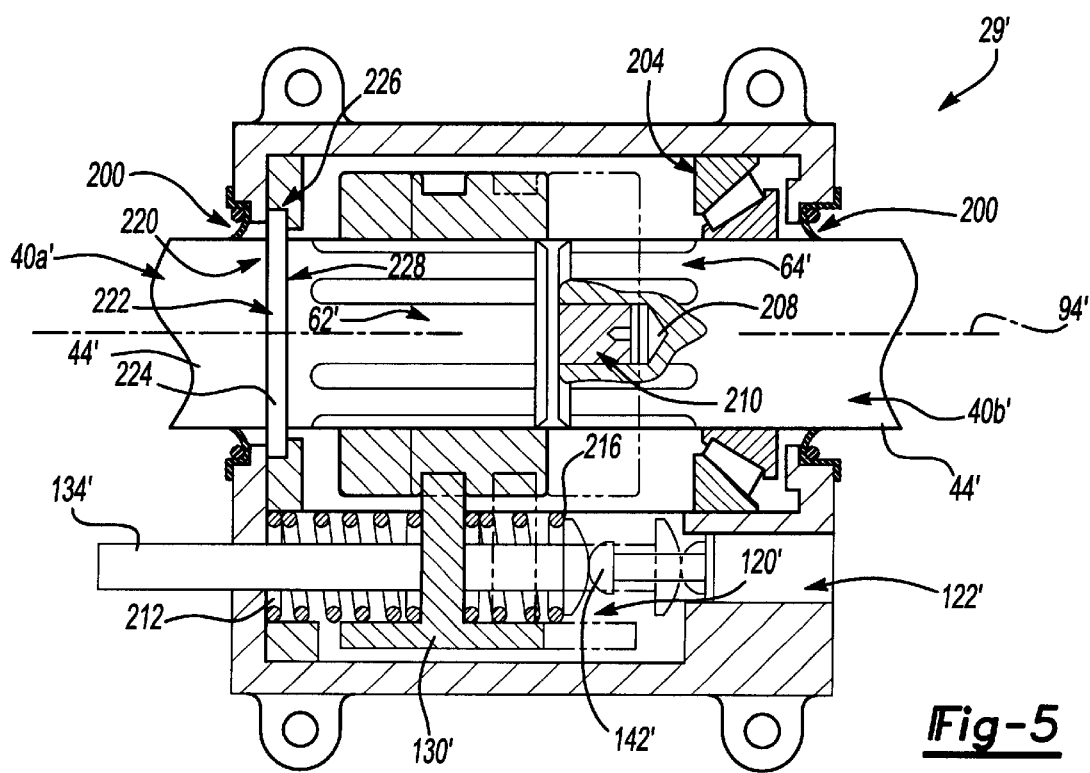
FIG. 5 is a longitudinal cross-section similar to that of FIG. 3 but illustrating an alternately constructed clutch assembly.

In FIG. 5, an alternately constructed stabilizer bar assembly 29' is illustrated. A pair of seals 200 sealing engage the central segments 44' of stabilizer bar members 40a' and 40b'. First gear member 62' is illustrated to be fixedly coupled to the proximal end of stabilizer bar member 40a' and second gear member 64' is illustrated to be fixedly coupled to the proximal end of stabilizer bar member 40b'. Stabilizer bar member 40b' is supported by bearing 204 for rotation within housing assembly 60'. Stabilizer bar member 40b' is illustrated to include a pilot aperture 208 which is configured to receive a pilot portion 210 that is coupled to stabilizer bar member 40a'. Pilot aperture 208 and pilot portion 210 cooperate to align stabilizer bar members 40a' and 40b' about rotational axis 94'.

Clutch fork 120' is illustrated to include a unitarily formed body portion 130' and a unitarily formed pin member 134'. Pin member 134' extends through an aperture (not specifically shown) formed into body portion 130' and is slidable along an axis that is generally parallel rotational axis 94'. First and second spring members 212 and 216, respectively, are disposed about pin member 134' and spaced axially apart by body portion 130'. Actuator device 122' is constructed such that actuator member 142' is normally maintained in the second actuator position. As first spring 212 has a spring rate that is relatively larger than that of second spring 216, the force generated by first spring 212 will be applied to body portion 130' such that coupling member 66 is normally maintained in a condition wherein it is engaged with second gear member 64' (i.e., clutch assembly 42' is normally maintained in the second condition which is indicated in phantom).

Upon the receipt of an actuator signal indicative of the desire to shift actuator member 142' to the second actuator position, actuator device 122' will extend actuator member 142' to contact pin member 134', causing pin member 134' to translate relative to body portion 130' and compress second spring 216. In this condition, the force generated by second spring 216 exceeds the biasing force that is exerted by the first spring 212, causing body portion 130' to slide axially and disengage coupling member 66 from second gear member 64'. In this arrangement, if the actuator signal is lost (e.g., in the event of a power failure), actuator device 122' will not maintain actuator member 142' in the first actuator position, thereby permitting the biasing force of first spring 212 to shift body portion 130' so that coupling member 66 engages second gear member 64'.

Stabilizer bar assembly 29' is also shown to include a stop device 220 which is coupled to stabilizer bar member 40a'. Stop device 220 includes a stop member 222 that is operable for restraining stabilizer bar member 40a' from moving axially along rotational axis 94' by an amount that exceeds a predetermined amount. In the particular embodiment illustrated, stop member 222 is a retaining ring 224 which is coupled to stabilizer bar member 40a', the retaining ring 224 being disposed in a pair of retaining ring grooves 226 and 228 formed in the housing assembly 60' and the stabilizer bar member 40a', respectively, in a manner that is well known in the art.

Figure 7:
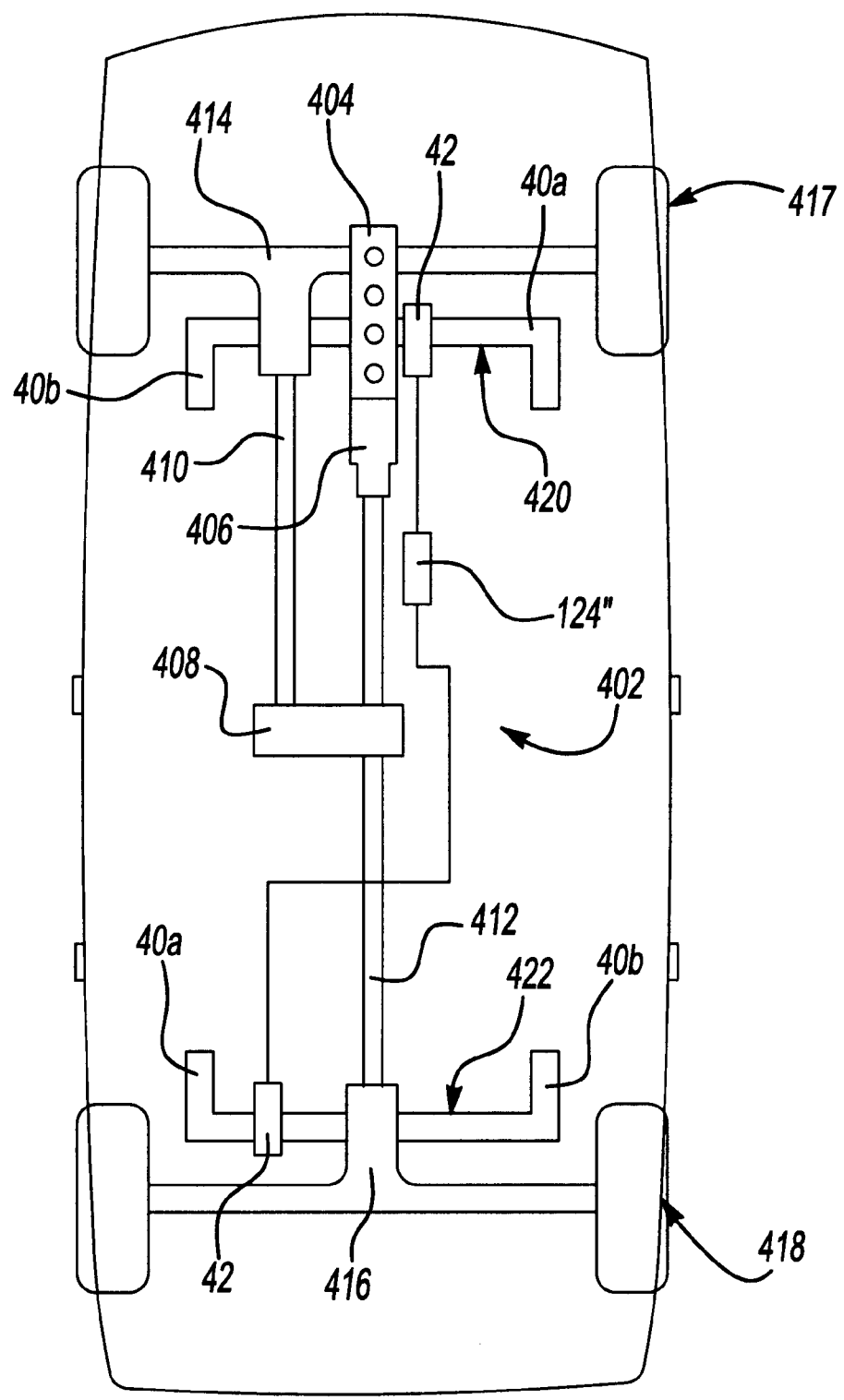
FIG. 7 is a schematic illustration of an exemplary vehicle constructed in accordance with another embodiment of the present invention.

In FIG. 7, a vehicle constructed in accordance with the teachings of another alternate embodiment of the present invention is generally indicated by reference numeral 400. Vehicle 400 is shown to be a four-wheel drive vehicle having a conventional powertrain 402 with an engine 404, a transmission 406, a transfer case 408, front and rear propshafts, 410 and 412, respectively, and front and rear axle assemblies 414 and 416, respectively, for driving a set of front wheels 417 and a set of rear wheels 418. The transfer case 408 conventionally permits the front axle assembly 414 to be disengaged from the engine 404 so that engine power is transmitted only to the rear wheels 418 to permit the vehicle 400 to be operated in a 2-wheel drive mode. The vehicle 400 also includes front and rear stabilizer bar assemblies 420 and 422, both of which are identical in construction to that of stabilizer bar assembly 29 except that a common controller 124" is employed to control the operation of both stabilizer bar assemblies 420 and 422.

With additional reference to FIG. 8, the methodology employed by the controller 124" to control the operation of both stabilizer bar assemblies 420 and 422 is illustrated schematically in flowchart form. Advantageously, the methodology of the present invention permits the stabilizer bar assemblies 420 and 422 to be coupled and uncoupled in a manner that prevents the vehicle 400 from being subjected to roll steer. The methodology begins at bubble 500 wherein the stabilizer bar member 40a of each of the stabilizer bar assemblies 420 and 422 are engaged to their associated stabilizer bar member 40b. The methodology progresses to decision block 504 where the methodology determines whether the vehicle operator has selected a predetermined operational mode (e.g., offroad). Those skilled in the art will understand that the manner in which the predetermined operational mode is selected my comprise a switch input from a toggle or pushbutton switch that is mounted, for example, on the vehicle instrument panel, or via the selection of a predetermined gear ratio, as when, for example, the transfer case 408 is placed in a 4-wheel drive mode. If the vehicle operator has not selected the predetermined operational mode, the methodology loops back to bubble 500. If the vehicle operator has selected the predetermined operational mode in decision block 504, the methodology proceeds to decision block 508.

In decision block 508, the methodology determines whether the powertrain 402 is operating in the predetermined operational mode. If, for example, the predetermined operation mode is the operation of the vehicle 400 in a 4-wheel drive mode, the methodology determines in decision block 508 whether power from the engine 404 is being transmitted to the front axle assembly 414. If the power train 402 is not operating in the predetermined operational mode, the methodology loops back to bubble 500. If the power train 402 is operating in the predetermined operational mode, the methodology proceeds to decision block 512.

In decision block 512, the methodology determines whether the speed of the vehicle 400 is less than a predetermined threshold speed. If the speed of the vehicle 400 is not less than the predetermined threshold speed, the methodology loops back to bubble 500. If the speed of the vehicle 400 is less than the predetermined threshold speed in decision block 512, the methodology proceeds to block 516 wherein the stabilizer bar members 40a and 40b of the stabilizer bar assembly 422 associated with the rear axle assembly 416 are disconnected from one another. The methodology then proceeds to block 520 to permit a predetermined amount of time, such as 2 seconds, to elapse so as to ensure that the stabilizer bar members 40a and 40b of the stabilizer bar assembly 422 are completely disconnected before proceeding to the next step of the methodology.

After the predetermined amount of time has elapsed in block 520, the methodology proceeds to block 524 wherein the stabilizer bar members 40a and 40b of the stabilizer bar assembly 420 associated with the front axle assembly 414 are disconnected from one another. The methodology then proceeds to decision block 528.

In decision block 528, the methodology determines if the speed of the vehicle 400 is greater than the predetermined speed threshold. If the speed of the vehicle 400 is not less than the predetermined speed threshold, the methodology proceeds to block 536. If the speed of the vehicle 400 is less than the predetermined speed threshold, the methodology proceeds to decision block 532.

In decision block 532, the methodology determines whether the vehicle operator has de-selected the predetermined operational mode (e.g., canceled the offroad mode to revert to an on-road mode). If the vehicle operator has not de-selected the predetermined operational mode, the methodology loops back to decision block 528. If the vehicle operator has de-selected the predetermined operational mode, the methodology proceeds to block 536.

In block 536, the methodology causes the stabilizer bar members 40a and 40b of the stabilizer bar assembly 420 associated with the front axle assembly 414 to be connected to one another. The methodology then proceeds to block 540 to permit a predetermined amount of time, such as 2 seconds, to elapse so as to ensure that the stabilizer bar members 40a and 40b of the stabilizer bar assembly 420 are completely disconnected before proceeding to the next step of the methodology.

After the predetermined amount of time has elapsed in block 540, the methodology proceeds to block 544 wherein the stabilizer bar members 40a and 40b of the stabilizer bar assembly 422 associated with the rear axle assembly 416 are connected to one another. The methodology then loops back to bubble 500.

Control of the stabilizer bar assemblies 420 and 422 in this manner is highly advantageous in that because the front stabilizer bar 420 is never disengaged while the rear stabilizer bar assembly 422 is engaged, vehicle stability is maintained and the vehicle is not subjected to a roll-over steering effect that would render it difficult to maneuver.

While the methodology has been described thus far as being at least partially dependent upon the speed of the vehicle 400 relative to a predetermined threshold speed to attach or detach the stabilizer bar assemblies 420 and 422, those skilled in the art will appreciate that the invention, in its broader aspects, may be performed somewhat differently. In this regard, the determination to attach or detach the stabilizer bar assemblies 420 and 422 may be based upon a statistical moving average of the speed of the vehicle 400. Operation of the stabilizer bar assemblies 420 and 422 in this manner would permit operation of the vehicle 400 at a speed that shifts from a point somewhat above the speed threshold to another point somewhat below the speed threshold without requiring the stabilizer bar assemblies 420 and 422 engage and disengage each time the speed of the vehicle 400 exceeds or falls below the predetermined speed threshold. In this regard, the speed of the vehicle 400 may be analyzed as a function of time and the threshold signal for engaging the stabilizer bar assemblies 420 and 422 being generated in response to determining that an area under a curve defined by the vehicle speed as a function of time exceeds a predetermined threshold.

As another alternative, two discrete speed thresholds may be employed to trigger the engagement and disengagement of the stabilizer bar assemblies 420 and 422. In this regard, it is presently preferred that the speed threshold for triggering the engagement of the stabilizer bar assemblies 420 and 422 be greater than the speed threshold for triggering the disengagement of the stabilizer bar assemblies.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. In a stabilizer bar assembly for a vehicle having a pair of laterally-spaced wheels, the stabilizer bar assembly having first and second stabilizer bar members and a clutch assembly, the first stabilizer bar member adapted to be coupled to a first one of the pair of laterally-spaced wheels, the second stabilizer bar member adapted to be coupled to a second one of the pair of laterally-spaced wheels, the clutch assembly coupled to the first and second stabilizer bar members, the clutch assembly having a switch and an electrically-powered actuator that is adapted to be coupled to a vehicle power source, the electrically-powered actuator being responsive to a first control signal, the first control signal causing the electrically-powered actuator to uncouple the first and second stabilizer bar members to permit the first and second stabilizer bar members to rotate independently of one another, and the electrically-powered actuator being responsive to a second control signal, the second control signal causing the electrically-powered actuator to couple the first and second stabilizer bar members for rotation with one another, the switch receiving power from vehicle power source and selectively generating the first and second control signals, the improvement comprising a reserve powering apparatus for powering the electrically-powered actuator, the reserve powering apparatus including:

a power storage device coupled to the electrically-powered actuator and providing a supplemental source of electrical power; and a switching device coupled to the vehicle power source and the power storage device, the switching device being responsive to a failure of the vehicle power source to transmit electrical power to the switching device, the switching device electrically coupling the electrically-powered actuator to the power storage device in response to the failure such that electrical power from the supplemental source of electrical power is employed by the electrically-powered actuator to couple the first and second stabilizer bar members for rotation with one another when the vehicle power source fails to transmit electrical power to the switching device.

2. The stabilizer bar assembly of claim 1, wherein the power storage device is coupled to the vehicle power source and the reserve powering apparatus further comprises a back-feed preventing device interposed between the vehicle power source and the power storage device to prevent the power storage device from back-feeding electrical power to the vehicle power source.

3. The stabilizer bar assembly of claim 2, wherein the back-feed preventing device is a diode.

4. The stabilizer bar assembly of claim 1, wherein the power storage device is a capacitor.

5. The stabilizer bar assembly of claim 1, wherein the switching device is a relay.

6. The stabilizer bar assembly of claim 1, wherein the switching device further couples the switch to a ground terminal in response to the failure of the vehicle power source to transmit electrical power to the switching device to thereby inhibit the switch from generating the first control signal.

7. In a vehicle having a pair of laterally-spaced wheels and a stabilizer bar assembly with first and second stabilizer bar members and a clutch assembly, the first stabilizer bar member being coupled to a first one of the pair of laterally-spaced wheels, the second stabilizer bar member being coupled to a second one of the pair of laterally-spaced wheels, the clutch assembly coupled to the first and second stabilizer bar members, the clutch assembly having a switch and an electrically-powered actuator that is adapted to be coupled to a vehicle power source, the electrically-powered actuator being responsive to a first control signal produced by the switch, the first control signal causing the electrically-powered actuator to uncouple the first and second stabilizer bar members to permit the first and second stabilizer bar members to rotate independently of one another, and the electrically-powered actuator being responsive to a second control signal produced by the switch, the second control signal causing the electrically-powered actuator to couple the first and second stabilizer bar members for rotation with one another, the improvement comprising a controller for inhibiting the operation of the stabilizer bar assembly with the stabilizer bar members uncoupled from one another, the controller including:

a sensor for sensing a speed of the vehicle and generating a speed signal in response thereto;

a comparison circuit coupled to the sensor and receiving the speed signal and generating a threshold signal in response to receipt of a speed signal in excess of a predetermined threshold; and a switching device coupled to the clutch assembly and the comparison circuit, the switching device cooperating with the clutch assembly to cause the electrically-powered actuator to couple the first and second stabilizer bar members for rotation with one another in response to receiving the threshold signal from the comparison circuit.

8. The vehicle of claim 7, wherein the switching device is a relay that is configured to couple the switch to a ground in response to receiving the threshold signal.

9. The vehicle of claim 7, wherein the speed sensor and the comparison circuit are coupled to a vehicle network, the speed signal being transmitted to the comparison circuit through the vehicle network.

10. The vehicle of claim 7, wherein the comparison circuit generates a second threshold signal in response to receipt of a speed signal that is less than a second predetermined threshold, the switching device cooperating with the clutch assembly to cause the electrically-powered actuator to uncouple the first and second stabilizer bar members for rotation with one another in response to receiving the second threshold signal from the comparison circuit.

11. The vehicle of claim 10, wherein the threshold signal corresponds to a first vehicle speed and the second threshold signal corresponds to a second vehicle speed that is less than the first vehicle speed.

12. In a vehicle having a pair of laterally-spaced wheels and a stabilizer bar assembly with first and second stabilizer bar members and a clutch assembly, the first stabilizer bar member being coupled to a first one of the pair of laterally-spaced wheels, the second stabilizer bar member being coupled to a second one of the pair of laterally-spaced wheels, the clutch assembly coupled to the first and second stabilizer bar members, the clutch assembly having a switch and an electrically-powered actuator that is adapted to be coupled to a vehicle power source, the electrically-powered actuator being responsive to a first control signal produced by the switch, the first control signal causing the electrically-powered actuator to uncouple the first and second stabilizer bar members to permit the first and second stabilizer bar members to rotate independently of one another, and the electrically-powered actuator being responsive to a second control signal produced by the switch, the second control signal causing the electrically-powered actuator to couple the first and second stabilizer bar members for rotation with one another, the improvement comprising a controller for inhibiting the operation of the stabilizer bar assembly with the stabilizer bar members uncoupled from one another, the controller including:

a sensor for sensing a speed of the vehicle and generating a speed signal in response thereto;

a comparison circuit coupled to the sensor and receiving the speed signal, the comparison circuit analyzing the speed signal as a function of time, the comparison circuit generating a threshold signal in response to determining that an area under a curve defined by the speed signal as a function of time exceeds a predetermined threshold; and a switching device coupled to the clutch assembly and the comparison circuit, the switching device cooperating with the clutch assembly to cause the electrically-powered actuator to couple the first and second stabilizer bar members for rotation with one another in response to receiving the threshold signal from the comparison circuit.

13. In a vehicle having a pair of laterally-spaced front wheels, a pair of laterally-spaced rear wheels, and front and rear stabilizer bar assemblies, each of the stabilizer bar assemblies having a first stabilizer bar member adapted to be coupled to a first one of the pair of laterally-spaced wheels and a second stabilizer bar member adapted to be coupled to a second one of the pair of laterally-spaced wheels that is spaced laterally from the first one of the pair of laterally-spaced wheels, a method for controlling the front and rear stabilizer bar assemblies, the method comprising the steps of:

disconnecting the rear stabilizer bar assembly to permit the first and second stabilizer bar members of the rear stabilizer bar assembly to rotate independently of one another; and after a predetermined amount of time has elapsed since the disconnecting of the rear stabilizer bar assembly, disconnecting the front stabilizer bar assembly to permit the first and second stabilizer bar members of the front stabilizer bar assembly to rotate independently of one another.

14. The method of claim 13, further comprising the steps of:

establishing a plurality of predetermined conditions for coupling the front and rear stabilizer bar assemblies;

determining if at least one of the plurality of predetermined conditions has occurred; and if at least one of the plurality of predetermined conditions has occurred, coupling the front and rear stabilizer bars such that the front stabilizer bar assembly is initially connected to inhibit relative rotation between the first and second stabilizer bar members of the front stabilizer bar assembly, and the rear stabilizer bar assembly is connected to inhibit relative rotation between the first and second stabilizer bar members of the rear stabilizer bar assembly after a predetermined second amount of time has elapsed since the connecting of the front stabilizer bar assembly.

15. The method of claim 14, wherein the plurality of predetermined conditions includes operation of the vehicle at a speed that is greater than a predetermined speed threshold.

16. The method of claim 14, wherein the predetermined second amount of time is about 2 seconds.

17. The method of claim 13, wherein the predetermined amount of time is about 2 seconds.

18. In a vehicle having a pair of laterally-spaced front wheels, a pair of laterally-spaced rear wheels, and front and rear stabilizer bar assemblies, each of the stabilizer bar assemblies having a first stabilizer bar member adapted to be coupled to a first one of the pair of laterally-spaced wheels and a second stabilizer bar member adapted to be coupled to a second one of the pair of laterally-spaced wheels that is spaced laterally from the first one of the pair of laterally-spaced wheels, a method for controlling the front and rear stabilizer bar assemblies, the method comprising the steps of:

connecting the front stabilizer bar assembly to inhibit relative rotation between the first and second stabilizer bar members of the front stabilizer bar assembly; and after a predetermined amount of time has elapsed since the connecting of the front stabilizer bar assembly, connecting the rear stabilizer bar assembly to inhibit relative rotation between the first and second stabilizer bar members of the rear stabilizer bar assembly.

19. The method of claim 18, wherein the predetermined amount of time is about 2 seconds.

* * * * *

UNITED STATES PATENT AND TRADEMARK OFFICE
Certificate

Patent No. 6,637,757 B2

Patented: October 28, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Tom V. Ignatius, Waterford, MI (US); Jeffrey L. Kincaid, Clarkston, MI (US); William T. Reid, Jr., Holly, MI (US); Peter E. Asmaro, Troy, MI (US); and Michael C. Gaunt, Metamora, MI (US).

Signed and Sealed this Nineteenth Day of February 2008.

PAUL N. DICKSON
*Supervisory Patent Examiner*
Art Unit 3616